United States Patent
Groves

[11] 3,913,715
[45] Oct. 21, 1975

[54] MODULATABLE FRICTION CLUTCH CONTROLLED BY A CENTRIFUGAL FORCE AND ANGULAR ACCELERATION SENSITIVE VALVE

[75] Inventor: Frank W. Groves, Rockford, Ill.
[73] Assignee: Twin Disc, Incorporated, Racine, Wis.
[22] Filed: Aug. 22, 1974
[21] Appl. No.: 499,501

[52] U.S. Cl. ... 192/103 FA; 192/103 C; 192/104 F; 137/48
[51] Int. Cl.² .................................. F16D 43/284
[58] Field of Search ....... 192/103 F, 103 FA, 104 F, 192/105 F, 103 C

[56] References Cited
UNITED STATES PATENTS

| | | | |
|---|---|---|---|
| 2,208,865 | 7/1940 | Gette | 192/103 F |
| 2,328,091 | 8/1943 | Nutt et al. | 192/103 FA |
| 3,005,529 | 10/1961 | Bochan | 192/104 F |
| 3,578,120 | 11/1971 | Hilpert | 192/103 FA |
| 3,642,107 | 2/1972 | Borman et al. | 192/103 F |

Primary Examiner—Benjamin W. Wyche
Attorney, Agent, or Firm—James E. Nilles

[57] ABSTRACT

A hydraulic valve and control system for sensing rotational speed and change in the rotational speed of a rotating clutch member, which valve controls the amount of pressure fluid delivered to a hydraulically actuated clutch, and for consequently modulating or permitting slipping of the friction clutch so as to regulate the output speed thereof. Drastic coefficients of friction changes occur in friction type clutches of the type contemplated for use with the present invention, and the hydraulic control system of the present invention senses or anticipates the change in rotational speed and consequently, the change in coefficient of friction of the clutch, and additionally the present invention substantially eliminates all valve friction and bi-stability of prior art devices of this general character.

15 Claims, 5 Drawing Figures

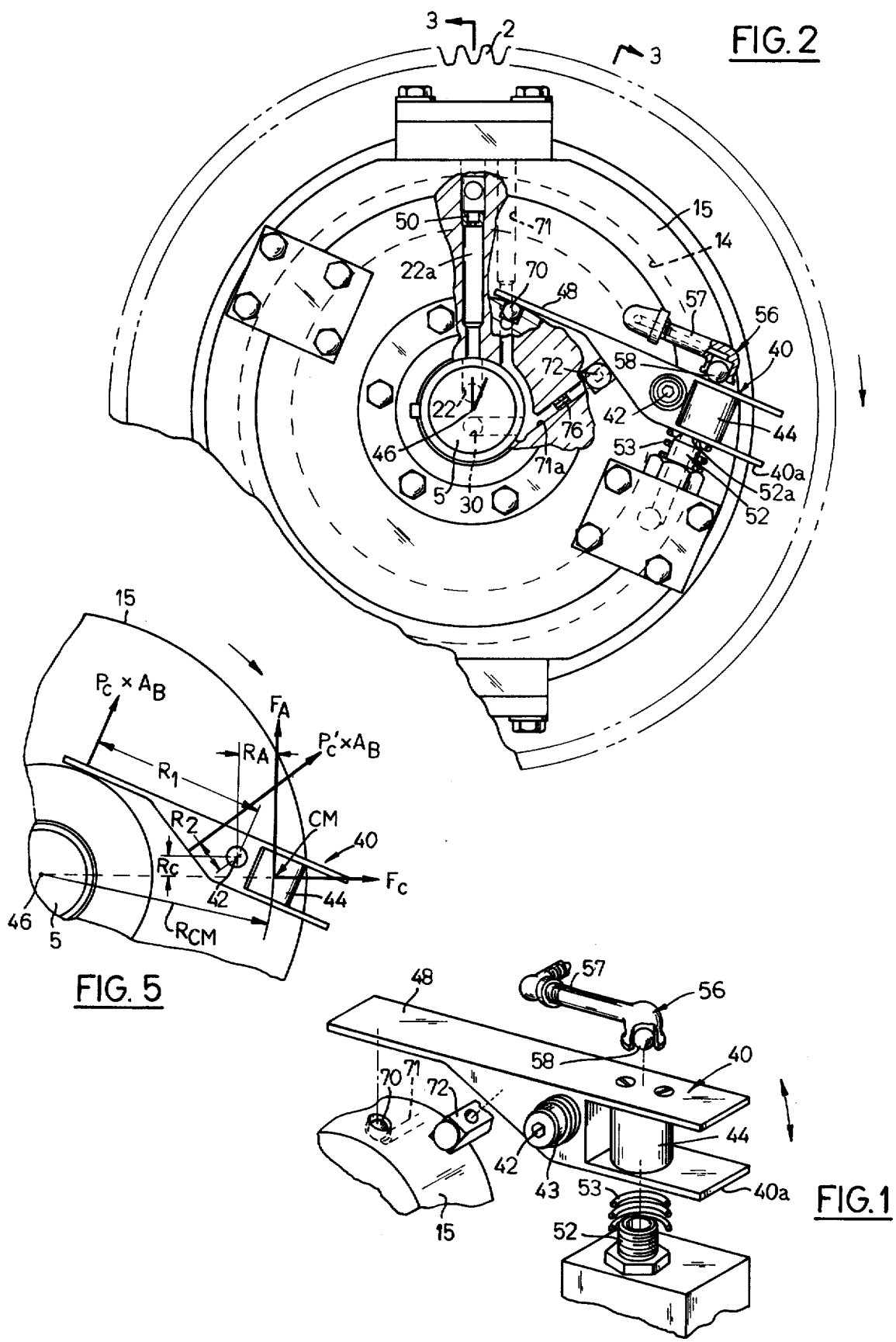

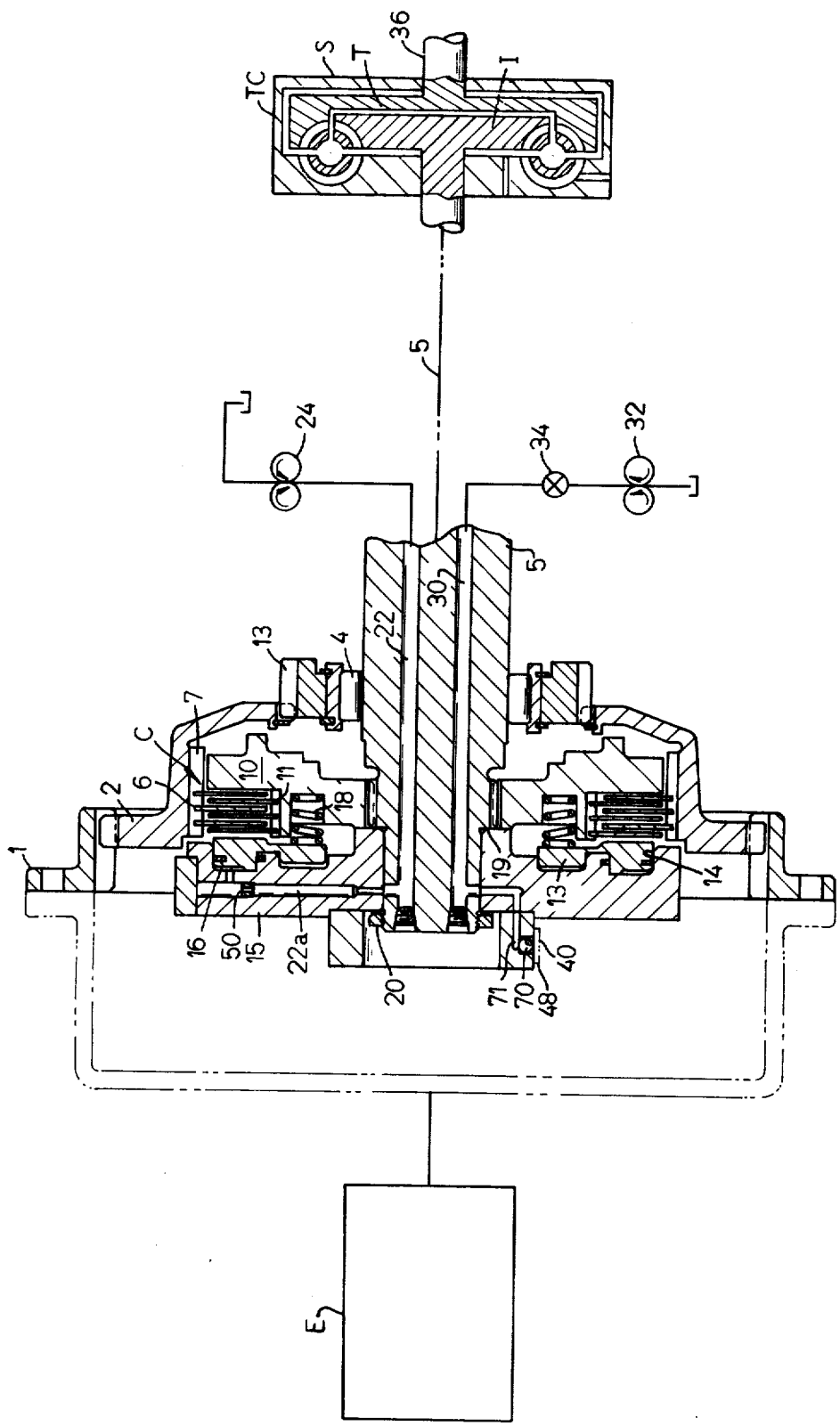

MODULATABLE FRICTION CLUTCH CONTROLLED BY A CENTRIFUGAL FORCE AND ANGULAR ACCELERATION SENSITIVE VALVE

BACKGROUND OF THE INVENTION

The present invention is an improvement over hydraulic control devices for modulatable friction plate type clutches and as shown in several patents which have been assigned to an assignee common with the present application. The coefficient of friction in friction clutches of this general type varies considerably, from a low value at high clutch plate slip speeds to a high value at very low speeds or locked up engagement of the clutch.

U.S. Pat. No. 3,352,395 issued Nov. 14, 1967 to C. R. Hilpert utilized a centrifugally operated, friction type clutch for controlling the speed of either the input or output member of the clutch, independently of variations in the coefficients in the clutch itself. The control system of that invention controlled the speed of the rotatable member in which it was located and that was done by controlling the clutch apply pressure to vary the slipping or modulation of the friction clutch. Both single pressure and two pressure control systems are described.

U.S. Pat. No. 3,358,796 issued Dec. 19, 1967 to Hilpert provides a valve means of the type referred to in the above patent, but which was more sensitive or responsive in anticipating the functions to be performed by the valve means by eliminating the friction developed by the sliding valve elements and/or the improper seating and sealing of the sliding valve elements. To do this, the patented device utilized balls as the shiftable valve elements.

U.S. Pat. No. 3,368,656, which issued Feb. 13, 1968 to Hilpert provided a control device of the above general character, and which provided an improved centrifugal ball valve which resulted in a more smoothly and quickly operating clutch and wherein the clutch was applied with increasing pressure as its speed decreased.

U.S. Pat. No. 3,403,763 which issued Oct. 1, 1968 to Hilpert had to do with power transmitting devices such as clutches or brakes of the friction plate type, which utilized hydraulic means for sensing torque between the drive and driven members and accordingly actuated the friction clutch to provide a constant output torque. This device used a rotary cylinder and piston for the sensing means and in which the friction plate apply pressure was separate from the control pressure and as a result the transmitted torque was a function of the control pressure and consequently readily adjustable.

U.S. Pat. No. 3,420,344, which issued Jan. 7, 1969 to Hilpert relates to a power transmitting device of this type having hydraulically actuated friction plates capable of being variably clamped and hydraulic means for measuring the delivered torque and accordingly varying the clamp-up force to thereby maintain the output torque constant. The was accomplished by providing a degenerative means in the form of fluid pressure which is a linear function of the torque transmitted due to the clutch apply pressure, and which degenerative fluid pressures were used to oppose the clutch apply pressure. As a result, the variations in clutch engagement which were due to the varying coefficient of friction in the clutch plates while they were being engaged or were in engagement become insignificant and the clutch responded accordingly. Stated otherwise, this device utilized torque responsive hydraulic means to provide inverse feedback pressure to insure a constant output torque.

U.S. Pat. No. 3,556,271 which issued Jan. 19, 1971 to Hilpert teaches the use of a power transmission including a fluid clutch of the type which is controlled by a condition at the clutch output; such as its speed or torque, and in which the output sensitive clutch is located ahead of and is connected to a torque converter for driving the latter and is also connected with a governor. Consequently, the input to the torque converter is set by the clutch in accordance with the power requirement of the load, to maintain a constant ground speed of the vehicle.

One problem encountered in control devices of this type is the repidity in which the coefficient of the friction of the friction clutch varies, making it difficult for the clutch control system to anticipate changes in angular speed.

Another shortcoming of some prior art controls was that they could not readily vary the control force acting on the clutch apply control valve, and as a result the latter could only be open or closed, resulting in erratic control.

U.S. Pat. No. 3,578,120 describes one mechanism for sensing the combined centrifugal and acceleration or deceleration forces for regulating speed. That patent shows a control device for hydraulically actuated friction plates of a clutch which are capable of being variably clamped up to control the amount of slipping of the clutch and consequently the power delivered by it. The patent includes means for sensing the change in angular speed, that is the deceleration or acceleration of one of the relatively movable parts. The change in angular speed is used to control the amount of actuating fluid being applied to the hydraulically operated clutch, thereby providing a transmission having torques limited to a designed amount. That invention limited the maximum heat rate in the clutch to a relatively low value which could be predetermined by the clutch designer, and which heat rate would then not be an unknown variable due to changing coefficients of friction in the clutch surfaces while the clutch was operating. The clutch of that invention permitted maximum engaging peak torque to be predetermined at a relatively low value, and which torque at clutch lock up never exceeded the stall torque.

SUMMARY OF THE INVENTION

The present invention provides a control system of the two pressure type, one of the fluid pressures being the clutch apply pressure which causes engagement of the clutch plates, and the other pressure being a variable control pressure. The present control system senses the rotational speed and the change in rotational speed of the member on which it is mounted and consequently responds very rapidly to a change in the coefficient of friction of the clutch plates which causes such rotational speed changes. The acceleration sensitivity of the present invention acts in conjunction with the centrifugal sensitivity so that in the event the rotational velocity of the controlled member attempts to increase beyond the desired amount, the clutch pressure is dumped in proportion to the sensed acceleration, and thereby reduced and, consequently, slows down the controlled member. Conversely, the valve proportionally increases apply pressure of the clutch if the controlled member decelerates, thereby causing increased speed of the controlled member.

A valve control pressure is provided and which has two pressure producing means acting on a swingable element to produce a control torque that is variable and which tends to close the clutch pressure dumping valve. The centrifugal force acting on the center of mass of the valve tends to open the clutch pressure dumping action. The control pressure varies, depending on the position of the swingable element, and this results in a stable and constant speed output. Control pressure and centrifugal force act in opposition to one another and seek an equilibrium condition by varying the apply pressure to attain a speed at which the valve is stable. In the event the rate of change of coefficient of the clutch plates becomes greater than the ability of this valve to respond, then the clutch apply pressure will be a pulsation of low amplitude and high frequency which is subsequently integrated by the rotational inertia of the control member and/or damped out by a torque converter or other mode of coupling.

The present invention provides a control system having a centrifugal and acceleration force sensitive valve which in turn controls the clutch apply pressure delivered to the actuating chamber of a friction clutch. The result is to maintain a constant rotational speed of any desired amount, from zero to full engine rotational speed, by varying the clutch apply pressure to a continuously slipping clutch.

The control system of the present invention includes a shiftable valve element, which is pivoted on a rotatable carrier member, and which has a weight mass close to its pivot point but at a considerable radius from the center of the clutch. Sensitivity of the present control system depends upon maximizing the centrifugal and acceleration forces on the valve and minimizing valve inertia (which enhances the weight's ability to respond rapidly to angular speed changes). The arrangement is such that the force which the control valve anticipates or "sees" is proportional to its distance from the rotational center of the clutch. The present invention is a "derivative" control because the pivoting valve senses rotational speed and its first derivative, namely a change in rotational speed, i.e., acceleration or deceleration.

These and other objects and advantages of the present invention will appear hereinafter as this disclosure progresses, reference being had to the accompanying drawings.

The present invention provides a centrifugal and acceleration force sensitive control system for a modulatable friction plate type clutch and which operates more smoothly and without the frictional problems of many of the prior art controls. Furthermore, the present control is much more simple and has fewer moving parts than many prior art controls.

BRIEF DESCRIPTION OF THE DRAWINGS

FIG. 1 is a fragmentary, combined perspective and exploded view of the present invention, certain other parts being shown as broken away or removed for the sake of clarity;

FIG. 2 is a transverse, elevational view of the centrifugal valve and its control mechanism as mounted on a hydraulically controlled friction type clutch, certain parts being shown as broken away or in section for clarity;

FIG. 3 is a longitudinal cross sectional view through the device shown in FIG. 2, the view being taken generally along the line 3—3 in FIG. 2, and in combination with a schematic showing of a source of power and a torque converter;

FIG. 5 is a diagram of the forces acting on the control mechanism.

DESCRIPTION OF THE INVENTION

Figure 4:
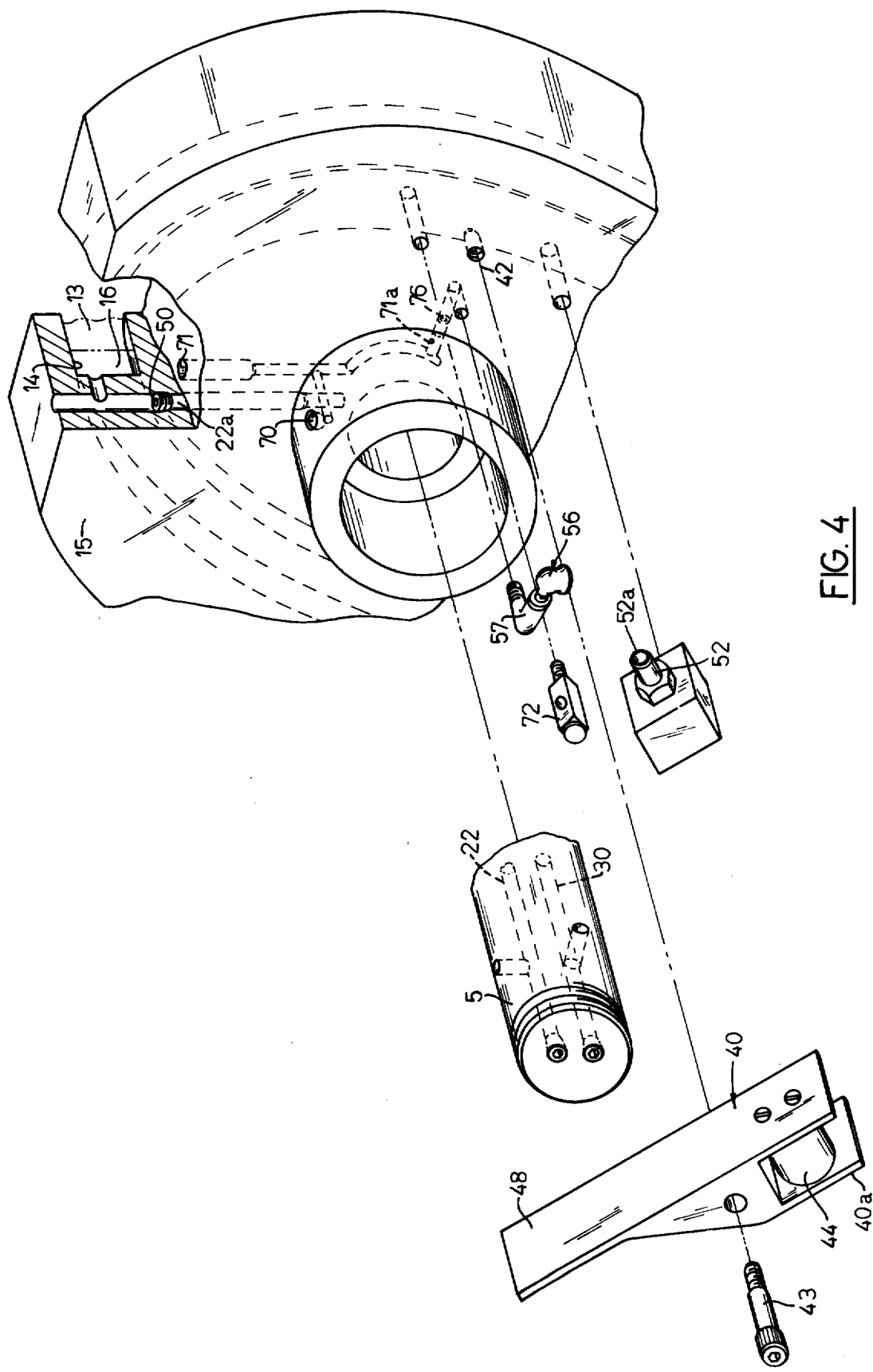
FIG. 4 is another fragmentary, exploded, perspective view of parts of the present invention, certain parts being shown in section or broken away for clarity.

The general organization of the power transmission embodying the present invention is shown in FIG. 3 and includes a power source E, such as an internal combustion engine or an electric motor, which rotatably drives the drive ring 1 that in turn drives the input spider 2. The input spider is rotatably mounted, through a drive gear 3, on anti-friction roller bearing assembly 4 which, in turn, is mounted on the output shaft 5. The input spider has a series of friction plates 6 axially slidable but rotationally fixed on its internal splines 7.

An output member is comprised of a clutch back-up member 10 which is splined to the output shaft 5 and has a series of friction clutch plates 11 that are axially shiftable to a limited degree and rotatable with the back-up member 10 by means of the spline connection at 11, in the well known manner. Clutch plates 6 and 11 form a series of interleaved friction plates which can be clamped up, disengaged or slippingly engaged to any degree in the known manner. An annular ring type clutch actuating piston 13 is axially slideable in the cylinder 14 formed in the carrier member 15 to thereby define a clutch actuating chamber 16 with the carrier. Clutch apply fluid pressure is admitted to the chamber 16 so as to cause axial shifting of the piston 13 to cause clamp up of the clutch plates in the known manner. The degree to which the chamber 16 is pressurized will determine the amount of clutch clamp up, that is the amount of modulation of the clutch. Conventional spring means 18 between the piston 13 and the back-up member 10 eliminate drag between clutch plates when the clutch actuating chamber 16 is not pressurized, thus insuring complete release of the clutch. The clutch C, thus formed by the interleaved clutch plates is of the hydraulically actuated, modulatable type.

The carrier or member 15 is fixed to the shaft 5 for rotation therewith and is held against the shoulder 19 of the shaft by the lock nut means 20 engaged on the end of the shaft.

Clutch apply fluid pressure is introduced into the rifle drilling 22 in the shaft 5 from a source of fluid pressure, such as a pump 24, and this pressure is constant, for example at 250 p.s.i. or more. This is referred to as the clutch apply pressure fluid.

The present invention is concerned with a two pressure control system and a source of control pressure fluid is introduced into a rifle drilled passage means 30 in the shaft 5 from another source of fluid pressure, such as a pump 32 and the amount of control pressure is variable by means of the valve 34, for example, it can be varied from between 0 to 300 p.s.i.

The power output shaft 5 is connected to torque converter TC of conventional character which includes a turbine member T, connected to the shaft 36, a stator member S and an impeller I which is connected with and driven by the shaft 5.

The valve element 40 is pivotally mounted on the carrier member 15 so as to be able to dump pressure apply fluid and thereby reduce the force applied to the clutch actuating piston 13. The element may be located on either clutch member, that is, on either the input or output member. The element 40 is pivotally mounted to the carrier about an axis 42 formed by the bolt 43 so that it can swing within a very limited amount. Axis 42 is parallel to the axis of rotation of the member 15. Element 40 includes a weight member 44 located radially outwardly of the pivot axis 42 but which is also located relatively close to the pivot axis. On the other hand, it will be noted that the weight 44 is at a considerable distance from the center of rotation 46 of the clutch. The weight is comprised of an extremely heavy metal such as Kennertrium or some other super-dense material. Kennertrium metal is approximately three times as heavy as steel. The rest of the element is preferably comprised of aluminum or some other hard, light-weight material. This combination of material provides for a small moment of inertia for the element 40 which, as will appear, enhances response and for a predictable center of mass of the element at the center of the weight 44 which renders the valve more predictable.

On the other side of the pivot axis 42, element 40 extends as an arm portion 48 on which the control pressure acts at two spaced points, as will appear. The clutch actuating pressure on the other hand is in communication with the element portion which is located on the opposite side of the pivot axis 42 to that on which the control pressure acts.

The apply pressure passage means 22a in the carrier member has an orifice 50 located therein and the passage 22a, in addition to being in communication with the clutch apply chamber 16, is also in communication with a valve member 52, which abuts against and is formed in part by the element 40. After clutch apply pressure has been subjected to orifice 50, the resulting pressure passes through the member 52 and to its open end, which end is adjustable by the valve side 40a. The valve is in the closed position when side 40a abuts against the end of member 52. When in this closed position, the clutch apply pressure is not dumped or released to any extent. The extent to which the clutch apply pressure is dumped from valve 52 depends on the distance of the valve 40 from the open end of the valve member 52. Thus, when the valve is swung away from valve member 52, clutch apply pressure is dumped from it, thus reducing the pressure to the clutch apply chamber 16.

A light spring 53 bearing against the valve 40 maintains the end of the valve 52 in an open position if the carrier should happen to stop in the position shown.

The valve element 40 is sensitive to changes in rotational speed, that is, it is sensitive to acceleration or deceleration of the carrier, and in order for element 40 to function in closing pressure fluid valve 52 or permitting fluid to be dumped to any degree therefrom, and without being influenced by the clutch apply pressure itself, the element 40 is hydraulically balanced on its side opposite from the valve 52. In other words, the element 40 functions in "ignorance" of the effect of clutch apply pressure itself. This is accomplished by means of balance means 56 which includes a pressure conduit 57 having a shiftable ball 58 at its end. Fluid apply pressure acts on the ball which then, in turn, abuts against the side of element 40 which is opposite from valve 52. Thus, clutch apply pressure in the conduit 57 forces the ball against element 40 so that clutch apply pressure in effect is presented on each of opposite sides of the element 40, thereby hydraulically balancing the element, that is, neutralizing the effect of clutch apply pressure on element 40, leaving it free to perform its function of regulating fluid flow from valve 52, under the influence of the control pressure. Stated otherwise, the function of the element 40, as far as clutch apply pressure is concerned, is to close valve 52 or regulate the amount of fluid dumped from it, in accordance with changes in rotational speed of the carrier 15.

With the above arrangement, the amount of pressure fluid in the clutch actuating chamber 16 is determined by (1) the constant supply pressure; (2) the size of the orifice 50; and (3) the amount of the opening of valve 52 which in turn depends on the position of the valve element 40.

Generally, as the pressure fluid in the clutch actuating chamber 16 increases, the speed of the impeller shaft 36 approaches the speed of the power source E. The torque carrying capacity of the clutch C is proportional to the product of the clutch apply fluid pressure times the clutch plate coefficient of friction. The purpose of the control of the present invention is generally to maintain a constant rotational speed of desired amount, from zero to full engine speed, by varying the clutch apply pressure to the continuously slipping clutch C.

The coefficient of friction of the clutch plates varies considerably, from a low value at high slip speeds to a high value at very low speeds and locked up engagement of the clutch. It is the rapidity of which this coefficient of friction varies that the present derivative vavle is directed to.

FIG. 5 illustrates the torques acting on the valve control means. Clockwise torque results from the control pressure at two points.

$$P_c \times A_B \times R_1$$

where
$P_c$ = control pressure
$A_B$ = cross sectional area of ball 70
$R_1$ = lever arm and $$P_c' \times A_2 \times R_2$$

where
$P_c'$ = pressure dependent on control pressure $P_c$, orifice 76, and element 40 position
$A_2$ = cross sectional area of hole at $P_c'$ (72)
$R_2$ = lever arm.

Counterclockwise torque results from centrifugal force.

$$M \times R_{CM} \times W^2 \times R_c \text{ where } M \times R_{CM} \times W^2 = F_c$$

$M$ = mass of weight 44
$R_{CM}$ = radius of center of mass from clutch center of rotation
$W$ = carrier 15 rotational speed
$R_c$ = centrifugal lever.

Acceleration torque is given by $$F_A \times R_A \text{ where } F_A = M \times R_{CM} \times \alpha$$

and

α= carrier 15 acceleration.

This torque is clockwise if the carrier tends to decelerate for the direction of rotation shown and counterclockwise for acceleration.

The position of element 40, relative to the clutch apply pressure valve 52, is determined by the various forces acting on element 40. One of these forces is a centrifugal force ($F_C$ in FIG. 5) on the weight 44 and which is dependent on the mass of the weight 44, the position of weight 44, and the rotational velocity. As rotational velocity increases, so does the centrifugal force acting on the mass 44 which tends to shift element 40 so as to open the variable orifice 52a which is formed by the valve 52 and the side of element 40. As the carrier rotates (in the direction of the curvilinear arrow shown) this increase in velocity causes element 40 to shift away from the valve 52 thereby opening the variable orifice 52a and reducing the clutch apply pressure in chamber 16. Another one of these forces acting on element 40 is rotational speed changes, such as an acceleration force ($F_A$ in FIG. 5) on the weight 44 which is proportional to the acceleration of the carrier 15. If the carrier attempts to increase its velocity in the direction of the curvilinear arrow shown, element 40 will pivot counterclockwise as shown in the drawing thereby causing the variable orifice 52a to open. Conversely, if the carrier decelerates in angular speed, element 40 will tend to close the variable orifice 52a. The position of element 40 is also determined by a third force; namely, by the force of the control pressure acting at the other end of element 40 as will now be described.

Another force acting on element 40 is a variable control pressure. Control pressure acts on element 40 both through two separate pressure producing means. One of these means is a ball 70 located in the control pressure passage 71 in the carrier and which is pressed against element 40 by the control pressure acting on the ball. Very little fluid leaks past the ball. The other means is through the flapper valve 72, which valve is simply formed by element 40 abutting against the opening 72. Thus the control pressure fluid acts via ball 70 and also through the flapper valve 72 to produce a clockwise force on the pivoted element 40 about its pivot axis 42 thereby tending to close the clutch apply pressure variable orifice 52a. In summary, the position of element 40 is determined by (1) centrifugal force on the weight; (2) an acceleration or deceleration force on the weight; and (3) the combined control action of the valve 72 and an orifice 76 and the pressure exerted by ball 70. Additionally, the control pressure varies, depending on the position of element 40, as will appear.

The flapper orifice valve 72 is in series with a constant orifice 76 located adjacent thereto in the control pressure passage 71a, and together they cause a variation of control fluid pressure dependent on the position of element 40. With only clutch apply pressure, say 250 p.s.i. any rotation of the member 15 will cause the element 40 to swing away from the variable orifice 52a, thereby tending to dump clutch apply fluid pressure, causing rotation of member 15 to slow down.

The operator can select a control fluid pressure which causes element 40 to close the variable orifice 52a thereby filling the clutch actuating chamber 16 with full clutch apply fluid pressure, and causing interleaved clutch plates to be clamped up. Consequently, the carrier 15 and the torque converter impeller I accelerate, within the limits permitted by element 40.

In the event that the acceleration force on element weight 44 creates enough to torque to overcome that torque which is created by the control fluid pressure, then element 40 will move to thereby open the variable orifice which in turn decreases clutch apply pressure in the piston chamber 16, thereby decreasing acceleration. Acceleration continues within these limits until the centrifugal force on the weight 44 of element 40 creates a torque equal to the control pressure torque. Element 40 then maintains a constant speed on the carrier 15 by adjusting the clutch apply fluid pressure The purpose of the control pressure valve 72 is to provide negative feedback to the pivoted arm. The control pressure as established by valve 34 remains as set by the operator but if the valve position changes, the $P_c'$ changes and this will help prevent over-travel of the arm and thus provide stability.

The use of a pressure producing means such as ball 70 by itself would not result in a control pressure which varied with the position of element 40. Therefore valve 72 and its orifice 76 are provided. The flapper orifice 72 in series with the fixed orifice 76 causes a variable control fluid pressure dependent on the element 40 position which will cause element 40 to attain a stabilized position and consequently produce a constant apply fluid pressure. In the event the rate of change of coefficient of friction becomes greater than the ability of element 44 to respond, then the apply fluid pressure will be a pulsation of low amplitude and high frequency which is subsequently damped out by the torque converter.

With the hydraulic control system of the present invention, a stable control action is provided because changes in rotational speed, either acceleration or deceleration are anticipated by the control and a proportional apply pressure correction, thereby preventing hunting as in prior art control devices. That is to say, acceleration and deceleration rates provide proportional forces that anticipate the condition dictated by the control forces, thereby preventing hunting as in prior control devices. The control system of the present invention reacts quickly to changing angular speed variations.

The present invention provides a control valve having a weight which is located close to the pivot point of the valve and yet at a considerable radius of rotation. As a result it is possible to combine the sensitivity (sensing of the centrifugal and angular speed forces which are directly proportional to the radius of rotation) and minimum valve inertia which is inversely proportional to the square of the distance of the center of mass from the pivot point 42. Minimum valve inertia enhances the valve's ability to respond quickly.

The utility of the present valve is due to its ability to respond rapidly with an intelligent correction which is proportional to the deviation from the desired speed or the acceleration forces present.

I claim:

1. A modulatable, hyraulically actuated friction plate type clutch having an input member, an output member, interleaved friction clutch plates between said members, and hydraulically actuated means for slippingly clamping up said clutch plates, clutch apply pressure means for conducting clutch apply fluid pressure to said hydraulically actuated means thereby causing slipping engagement of said interleaved clutch plates, hydraulic control means comprising, an element pivotally mounted on one of said members, said clutch apply pressure means being in communication with said element and forming a valve therewith whereby said element can pivot and either close said apply pressure means and permit clutch clamp up or open said apply pressure means in varying degrees and dump said apply fluid pressure in vary amounts, and remotely controlled pressure means including a pair of spaced apart fluid operated pressure producing means acting on said pivoted valve element to tend to pivot said element to close said apply pressure means.

2. The hydraulic control system as set forth in claim 1 further characterized in that said element includes a weight mass located radially outwardly of said pivot point of said element so as to be subject to rotational speed and to change in rotational speed of said member and thereby swing said element relative to said clutch apply pressure means.

3. The hydraulic control system set forth in claim 1 further characterized in that said control pressure means includes two pressure producing means on said element, one of said pressure producing means including an orifice whereby the control pressure acting on said element will be varied depending on the position of said pivoted element.

4. The hydraulic control system set forth in claim 24 further characterized in that said control pressure means includes two pressure producing means on said element, one of said pressure producing means including an orifice whereby the control pressure acting on said element will be varied depending on the position of said pivoted element.

5. The clutch as set forth in claim 1 further characterized in that said element is pivoted on said one member about an axis parallel to the axis of rotation of said one member.

6. The clutch set forth in claim 1 including apply pressure balancing means acting on said element to counterbalance the effect of said clutch apply pressure means on said element whereby movement of said element is influenced only by said control pressure means.

7. The clutch set forth in claim 2 including apply pressure balancing means acting on said element to counterbalance the effect of said clutch apply pressure means on said element whereby movement of said element is influenced only by said control pressure means.

8. The clutch set forth in claim 3 including apply pressure balancing means acting on said element to counterbalance the effect of said clutch apply pressure means on said element whereby movement of said element is influenced only by said control pressure means.

9. The clutch set forth in claim 4 including apply pressure balancing means acting on said element to counterbalance the effect of said clutch apply pressure means on said element whereby movement of said element is influenced only by said control pressure means.

10. A modulatable, hydraulically actuated friction plate type clutch having an input member, an output member, interleaved friction clutch plates between said members, and hydraulically actuated means for slippingly clamping up said clutch plates, clutch apply pressure means for conducting clutch apply fluid pressure to said hydraulically actuated means thereby causing slipping engagement of said interleaved clutch plates, hydraulic control means comprising, an element pivotally mounted on one of said members, said element being pivoted on said one member about an axis parallel to the axis of rotation of said one member, said clutch apply pressure means being in communication with said valve element and forming a valve therewith whereby said element can pivot and either close said apply pressure means and permit clutch clamp up or open said apply pressure means in varying degrees and dump said apply fluid pressure in varying amounts, said element including a weight mass located radially outwardly of the pivot point of said element so as to be subject to rotational speed and to change in rotational speed of said member and thereby swing said element relative to said clutch apply pressure means; remotely controlled pressure means acting on said pivoted valve element to tend to pivot said element to close said apply pressure means, said control pressure means including two fluid operated pressure producing means acting on said element, one of said pressure producing means including an orifice whereby the control pressure acting on said element will be varied dependent on the position of said pivoted element; and apply pressure balancing means acting on said element to counterbalance the effect of said clutch apply pressure means on said element whereby movement of said element is influenced only by said control pressure means.

11. A modulatable, hydraulically actuable friction plate type clutch having an input and an output member with interleaved friction clutch plates therebetween, and hydraulic means for clamping up said clutch plates to provide a modulated clutch, clutch apply pressure means for conducting clutch apply fluid pressure to said hydraulic means, in element pivotally mounted on one of said member, said clutch apply pressure means having a discharge for forming a valve with said element whereby said element can pivot and either close said apply pressure means and permit clutch clamp up or open said apply pressure means in varying degrees and dump said apply fluid pressure is varying amounts, and remotely controlled pressure means acting on said pivoted valve element to tend to pivot said element to close said apply pressure means, said control pressure means including two fluid operated pressure producing means acting on said element, one of said pressure producing means including an orifice whereby the control pressure acting on said element will be varied depending on the position of said pivoted element.

12. The clutch as set forth in claim 11 further characterized in that said element is pivoted on said one member about an axis parallel to the axis of rotation of said one member.

13. The clutch set forth in claim 11 including apply pressure balancing means acting on said element to counterbalance the effect of said clutch apply pressure means on said element whereby movement of said element is influenced only by said control pressure means.

14. The clutch set forth in claim 12 including apply pressure balancing means acting on said element to counterbalance the effect of said clutch apply pressure means on said element whereby movement of said element is influenced only by said control pressure means.

15. The hydraulic control system as set forth in claim 11 further characterized in that said element includes a weight means located radially outwardly of said pivot point of said element so as to be subject to rotational speed and to change in rotational speed of said member and thereby swing said element relative to said clutch apply pressure means.

* * * * *